United States Patent [19]

Werner

[11] 3,709,038
[45] Jan. 9, 1973

[54] LIQUID LEVEL INDICATOR

[76] Inventor: Gerald L. Werner, 273 Westview Dr., Apt. 212, West Saint Paul, Minn. 55118

[22] Filed: March 1, 1971

[21] Appl. No.: 119,460

[52] U.S. Cl. ................................ 73/313, 73/DIG. 5
[51] Int. Cl. ............................................... G01f 23/12
[58] Field of Search ........... 73/DIG. 5, 313, 317, 319; 338/33

[56] References Cited

UNITED STATES PATENTS

| | | | |
|---|---|---|---|
| 2,405,140 | 8/1946 | Grimm | 73/DIG. 5 |
| 2,620,412 | 12/1952 | Ford | 73/317 X |
| 1,605,116 | 11/1926 | Kellum | 73/313 X |

Primary Examiner—Louis R. Prince
Assistant Examiner—Daniel M. Yasich
Attorney—Merchant & Gould

[57] ABSTRACT

A fuel gauge utilizing magnetic coupling to rotate a follower magnet having a wiper arm attached thereto for sequentially engaging a plurality of circularly spaced electrical contacts. The contacts are connected to fuel level indicator lights positioned, for example, on a snowmobile instrument panel. The drive magnet is attached to a helical element rotatable by the vertical movement of a float assembly in engagement therewith.

6 Claims, 6 Drawing Figures

PATENTED JAN 9 1973 3,709,038
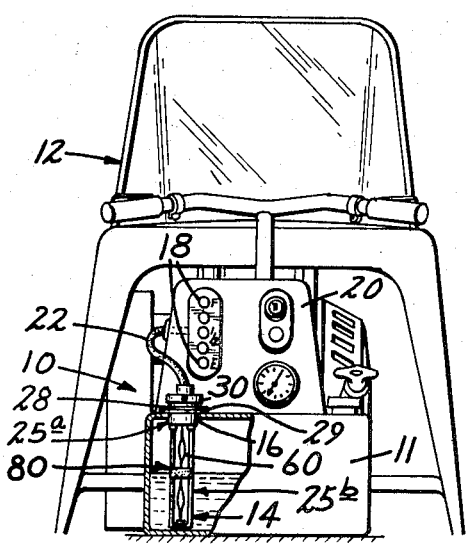
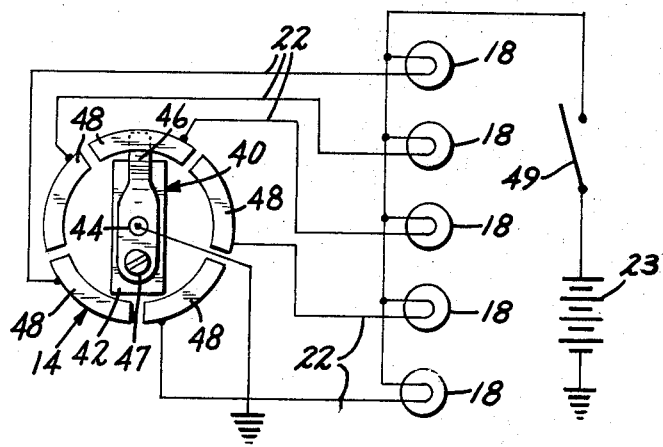
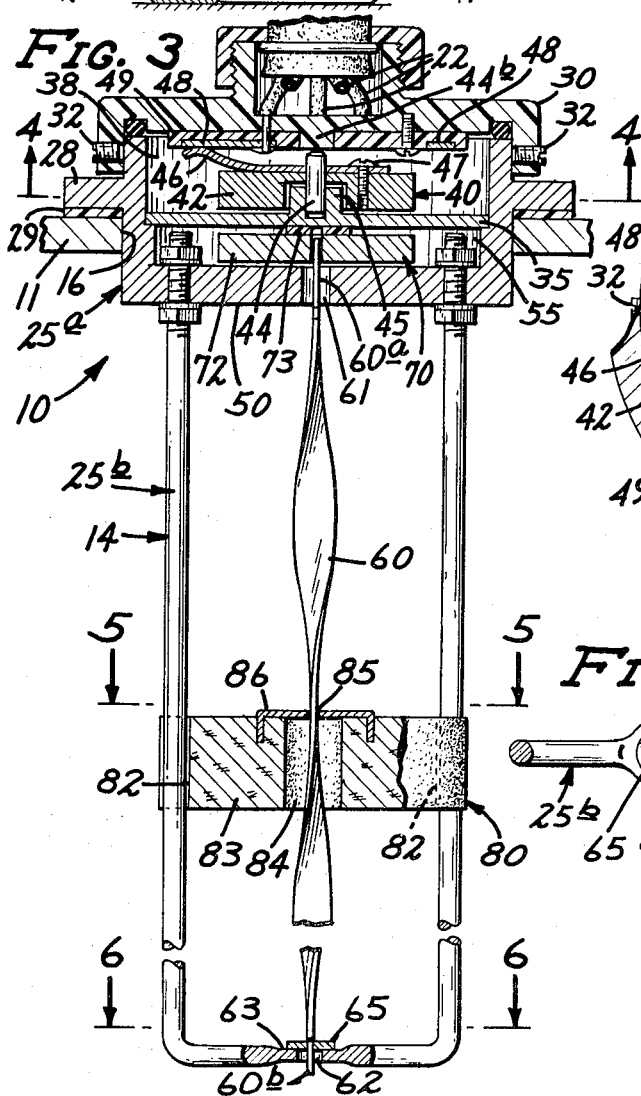
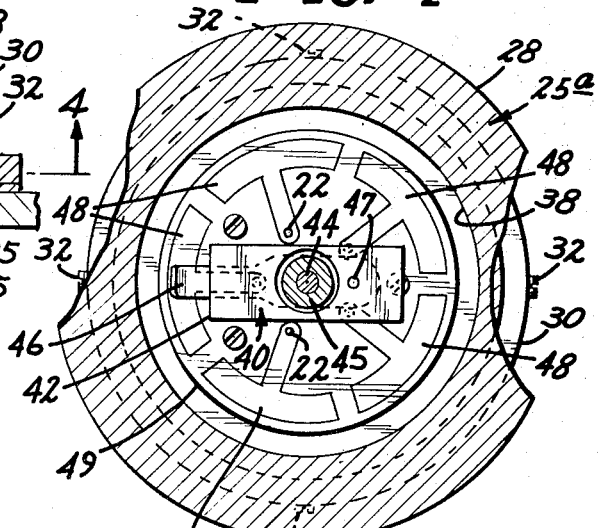
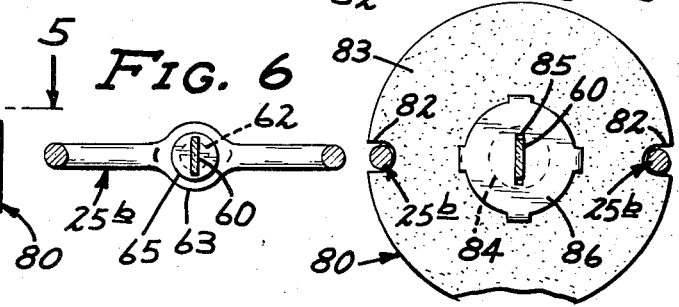
INVENTOR.
GERALD L. WERNER
BY
Merchant & Gould
ATTORNEYS

LIQUID LEVEL INDICATOR

BACKGROUND OF THE INVENTION

This invention pertains to apparatus for indicating the level of a liquid at a position remote from the liquid container.

Liquid level indicators have numerous well known applications, one of which is to indicate the fuel level in various gasoline power driven vehicles. In such applications, the indicator apparatus frequently includes electrical circuitry for allowing the gasoline level to be read at a position remote from the fuel tank (e.g. on the vehicle instrument panel or dashboard). The use of both indicator lights and pointer-type gauges is known for the purpose of providing remote readout.

In one well known type of fuel gauge, the gasoline level is sensed by a ball float connected to a pivotable arm (gauges of this type are hereinafter referred to as float-type gauges). The pivotable arm commonly includes a portion thereof which serves (1) as a wiper arm to sequentially engage electrical contacts forming part of the remote readout apparatus and/or (2) to provide a direct indication of the liquid level (e.g. on a graduated scale on the fuel tank). See, e.g., U.S. Pat. No. 3,002,186. However, in certain instances, the use of float-type fuel gauges is highly undesirable. This is particularly true, for example, in determining the gasoline level in snowmobile fuel tanks. Here, the rapid and sometimes violent motion of the snowmobile causes frequent mechanical failures in float-type gauges as well as inaccurate fuel level readings. Although it is known to use fuel gauges wherein the float arm is replaced by a float actuated helix (hereinafter referred to as helix-type fuel gauges), the helix-type gauges presently available do not provide remote readout. Thus, in the case of snowmobiles, as well as in other applications, a fuel gauge which (1) provides an accurate and remote fuel level readout and (2) which is reliable over extended periods of use is commercially highly desirable.

SUMMARY OF THE INVENTION

The liquid level indicator apparatus provided by the present invention includes a frame or casing mountable within a liquid container. A helical element attached to the frame for rotation in a generally vertical plane is rotated in response to changes in the liquid level by the vertical movement of float means in engagement therewith. Coupling means associated with the helical element causes a wiper arm to rotate therewith so as to sequentially contact a plurality of electrical contacts isolated from the gases within the liquid container by suitable sealing means. In the preferred embodiment, each of the electrical contacts is connected to a remotely positioned indicator light (e.g. located on a snowmobile dashboard) for indicating the level of the liquid (e.g. gasoline) within the fuel tank. Further, the coupling means preferably includes a drive magnet attached to the helical element within the liquid container and a follower magnet mounted external to the container and rotatable by magnetic coupling with the drive magnet. In this embodiment, the sweep arm is affixed to the follower magnet.

The helical-type fuel level indicator provided by this invention is reliable over extended periods of use. Further, it includes apparatus for allowing the fuel level to be determined at a position remote from the fuel tank. For example, by utilizing magnetic coupling to rotate the follower magnet and attached sweep arm, the fuel tank can be completely sealed to prevent the escape of gases from a volatile liquid. This eliminates the possibility of fire or explosion caused by an electrical spark igniting a flammable gas. In the preferred embodiment, the electrical contacts are positioned such that the sweep arm is always in engagement with at least one contact. This provides a continuous visual indication of the fuel level. Numerous additional advantages, such as the fuel indicator's relatively simple design, will become apparent from the Detailed Description hereinbelow.

BRIEF DESCRIPTION OF THE DRAWINGS

FIG. 1 is a partially fragmented view illustrating the utilization of the present invention to indicate the fuel level in a snowmobile gasoline tank;

FIG. 2 is a schematic illustration of the electrical circuitry for the present fuel gauge;

FIG. 3 is an axial cross-sectional view of the liquid level sensor unit mounted in the snowmobile gasoline tank;

FIG. 4 is a cross-sectional view taken along the line 4—4 of FIG. 3;

FIG. 5 is a cross-sectional view taken along the line 5—5 of FIG. 3; and

FIG. 6 is a cross-sectional view taken along the line 6—6 of FIG. 3.

DETAILED DESCRIPTION OF THE PREFERRED EMBODIMENT

Referring particularly to FIG. 1, the present liquid level indicator apparatus, generally designated 10, is used to indicate the fuel level in a gasoline tank 11 mounted on a snowmobile 12. The fuel gauge 10 includes a sensor unit or probe 14 mounted in an opening 16 in gasoline tank 11. The gasoline level within tank 11 is remotely indicated by an indicator gauge in the form of a series of indicator lights 18 mounted on an instrument panel 20 of snowmobile 12. Electrical leads 22 are provided to connect sensor unit 14, lights 18 and a suitable electrical power source 23 (shown schematically in FIG. 2).

Although liquid level indicator 10 has numerous additional applications other than sensing fuel levels in snowmobile gasoline tanks (e.g. it can readily be used on pleasure boats to remotely indicate gasoline level), the sturdiness, accurate sensing and mechanical reliability of fuel gauge 10 renders it particularly desirable for use with snowmobiles. In view of this, the following description relates to such an application of fuel gauge 10.

To obtain a fuller understanding of sensor unit 14, reference should be had to FIGS. 3–6. The liquid level sensor 14 includes a frame having a cylindrically shaped upper portion 25a force fitted within opening 16 in fuel tank 11 and a substantially open lower portion in the form of a U-bolt 25b. As shown, upper frame portion 25a includes a flange portion 28 which engages gasoline tank 11 about opening 16. A gasket 29 is positioned between flange 28 and tank 11. A cap member 30 is positioned over the upper end of frame portion 25a. A plurality of set screws 32 secure cap member 30 to frame portion 25a.

The upper frame portion 25a includes a transverse member 35 extending snugly between the inner walls thereof so as to close or seal opening 16. A chamber 38 is defined by the upper surface of transverse member 35 and the inner surfaces of cap member 30. Chamber 38 is isolated from the gasoline vapors within tank 11 by sealing means which, in the embodiment illustrated, comprise flange 28, gasket 29 and transverse portion 35 of frame portion. Positioned within chamber 38 is a follower magnet assembly 40 including a horizontally extending bar magnet 42 adjacent the upper edge of transverse member 35. A shaft 44 fixedly engages magnet 42 and extends vertically therethrough. As illustrated, shaft 44 is journaled in a center or hub portion 45 of transverse member 35 for rotation along the longitudinal axis of elongated sensor probe 14. Thus, follower magnet 42 is freely rotatable within chamber 38. A sweep arm 46 is attached to the upper surface of magnet 42 by a screw 47. Sweep arm 46 extends outwardly and upwardly so as to engage one of a plurality of circularly spaced electrical contacts 48 on a printed circuit board 49 attached to the inner top surface of cap member 30. Each of the contacts 48 is connected to a different one of the indicator lights 18 and to a power source 23 on snowmobile 12 (e.g. the snowmobile alternator or magneto). A switch 49 is included in the circuit for disconnecting power source 23, but is unnecessary for the operation of the present fuel gauge. As shown, sweep arm 46 is grounded.

The upper frame portion 25b includes a substantially closed lower end 50 to which the ends of U-bolt 25b are attached to form unitary sensor 14. A chamber 55 is defined by the upper surface of end 50, the lower surface of transverse member 35, and the inner walls of frame portion 25a.

A helical element 60 is rotatably attached to frame portion 25b for rotation along the longitudinal axis thereof. As shown, helix 60 has an upper portion 60a which extends loosely through an opening 61 in end 50. A lower portion 60b of helix 60 is journaled in an opening 62 through an enlarged bottom portion 63 of frame 25b. A washer 65 is positioned on lower portion 60b above opening 62. A drive magnet assembly 70 in the form of a horizontally extending bar magnet 72 loosely engages the upper rod-like portion 60a of helical element 60 within chamber 55. A Teflon spacer or washer 73 is attached to the upper surface of magnet 72. On insertion of follower magnet 42 within chamber 38, drive magnet 72 is pulled upward by the magnetic attraction between the two magnets 42 and 72 and the washer 73 engages the lower surface of transverse member 35.

For accurate fuel level readings and reduction of mechanical failures, it is highly important to minimize the friction between helical element 60 and the upper frame portion 25a. To reduce such friction, the opening 61 in end 50 of frame portion 25a is sufficiently large so as to allow helix portion 60a to pass loosely therethrough. This, of course, also allows gas fumes to enter chamber 55. However, transverse member 35 prevents the gas fumes from escaping from container 11.

The helical element 60 is caused to rotate by the vertical movement of a float means 80 in the form of a cylindrically shaped cork 83. The cork 83 includes two oppositely disposed recesses 82 in the outer edges thereof for engaging frame 25b so as to prevent rotational movement of float 80. As shown, helical element 60 extends through a circular bore 84 in cork 83 and a slot-like opening 85 defined by a metallic slot guide 86 attached to the upper surface of cork 83. The slot-like opening 85 engages the helical element 60 so as to cause rotation thereof upon vertical (i.e. up and down) movement of the float 80.

The operation of fuel gauge 10 can be explained as follows. The fuel gauge is first calibrated so that when float 80 is at a given level within tank 11 (e.g. at the bottom thereof), the indicator light 18 corresponding to that level (e.g. the empty light) is energized. Upon changes in the gasoline level within fuel tank 11, float 80 moves upwardly or downwardly in response thereto. This causes helical element 60 and drive magnet 72 to rotate. As a result of magnetic coupling through transverse member 35, the rotation of drive magnet 72 causes follower magnet 42 and attached sweep arm 46 to rotate. The rotating sweep arm 46 sequentially contacts different ones of the circularly spaced electrical contacts 48 so as to energize the indicator light 18 corresponding to the level of float 80. As can be seen from the FIGS. 2 and 4, the spatial separation between the circularly spaced contacts 48 is such that sweep arm 46 will engage adjacent ones thereof when passing therebetween. Thus, at least one of the lights 18 is always energized on dashboard 20 providing continuous visual indication of the gasoline level.

It is, of course, readily apparent that numerous modifications can be made to the above described embodiment. For example, various alternate types of magnet assemblies and float means can be utilized. This being the case, it is my intent to be limited solely by the spirit and scope of the appended claims.

What is claimed is:
1. Liquid level indicator apparatus, comprising:
 a. means defining a frame mountable within a liquid container;
 b. a helical element rotatably attached to said frame and extendable generally vertically within the liquid container;
 c. float means engaging said helical element for causing rotation thereof on vertical movement of said float in response to changes in the liquid level within the container;
 d. a plurality of spatially separated electrical contacts connectable to a remotely located liquid level indicator gauge;
 e. sealing means positioned between the electrical contacts and the liquid containing compartment of the liquid container;
 f. a rotatable sweep arm for sequentially engaging said electrical contacts to energize the liquid level indicator gauge, said sweep arm simultaneously engaging adjacent ones of said electrical contacts in passing therebetween;
 g. coupling means including a drive magnet positioned within the liquid container rotatable with said helical element and a rotatably mounted follower magnet isolated from the liquid containing compartment by said sealing means and rotatable by magnetic coupling with said drive magnet in a plane generally parallel thereto; and
 h. said sweep arm is affixed to said follower magnet for rotation therewith.

2. The liquid level indicator apparatus of claim 1 wherein
said liquid level indicator gauge includes a plurality of indicator lights each connected to a different one of said plurality of electrical contacts.

3. Fuel level indicator apparatus, comprising:
a. means defining a frame having an elongated portion for extending generally vertically within a fuel container through an opening therein and having a transverse portion for fitting snugly within the opening;
b. a helical element attached to said frame and mounted for rotation within the elongated portion along generally the longitudinal axis thereof;
c. float means engaging said helical element for causing rotation thereof on vertical movement of said float in response to changes in the fuel level within the container;
d. a drive magnet assembly attached to said helical element adjacent a lower surface of said transverse portion and rotatable with said helical element;
e. a sealed follower magnet assembly rotatably attached to said frame adjacent an upper surface of said transverse portion for rotational movement on rotation of said drive magnet; and
f. electrical circuitry means including a remotely located fuel indicator gauge, a plurality of circularly spaced electrical contacts connected to said fuel gauge and a sweep arm attached to said follower magnet and rotatable therewith to sequentially engage said electrical contacts for providing a closed electrical circuit between said contacts and indicator gauge, said sweep arm simultaneously engaging adjacent ones of said electrical contacts in passing therebetween.

4. The fuel level indicator apparatus of Claim 3 wherein said follower and drive magnet assemblies include donut-shaped magnets each positioned in a generally horizontal plane on opposite sides of said frame transverse portion.

5. The fuel level indicator apparatus of Claim 3 wherein:
a. said float means includes upper and lower generally horizontal surfaces and a slot extending vertically between said surfaces; and
b. said helical element extends vertically through said slot, the edges of said slot engaging said helical element to cause rotational movement of said element on vertical movement of said float.

6. The fuel level indicator apparatus of claim 3 in combination with a snowmobile wherein:
a. the fuel containable within the fuel container is gasoline;
b. said frame transverse portion entirely closes the opening in the container preventing gasoline vapors from escaping therefrom; and
c. said liquid level indicator gauge includes a plurality of indicator lights mounted on the snowmobile instrument panel, each light being connected to a different one of said plurality of electrical contacts.

* * * * *